Patented Apr. 25, 1950

2,505,229

UNITED STATES PATENT OFFICE 2,505,229

METHOD OF SENSITIZING LATEX APPLICABLE TO THE MANUFACTURE OF ARTICLES BY MOLDING AT NORMAL TEMPERATURES

Patrice Compagnon, Neuilly sur Seine, France, assignor to Societe a Responsabilite Limitee dite: Societe Auxiliaire de l'Institut Francais du Caoutchouc, Paris, France No Drawing. Application January 31, 1947, Serial No. 725,749. In France May 31, 1946

7 Claims. (Cl. 195—29)

The known methods of producing molded latex articles are based upon the principle of thermo-sensitization. In this respect notably the simultaneous action of zinc oxide and ammonium salts according to Kaysam's method and the action of zinc oxide alone according to Chassaing's method are well known.

In the French Patent Prov. No. 510,701 filed by the Societe Auxiliaire de l'Institut Francais du Caoutchouc for a "Method of producing latex articles" it has been shown that Chassaing's method is also applicable to fresh latex provided the latter is preparatorily subjected to definite physical, chemical or biological actions.

I have now found that slightly ammoniated latex can also be treated with ferments or ferment-generating substances in such manner that after the addition thereto of zinc oxide it will gelify at normal temperature after a certain time during which it loses nothing of its fluidness, this enabling to cast it into molds. The gel obtained possesses all the properties required for the obtainment of molded articles, viz.: cohesion, firmness and homothetic shrinkage at stripping.

This method, which may be called a time-sensitization method, secures several advantages that are useful in the production of certain articles:

(a) Water-baths, steam-baths and like heating apparatus are done away with, so that the equipment becomes less expensive and elaborate; this advantage is particularly valuable with articles involving the use of large-size molds and where production on the spot in the colony is contemplated;

(b) In the production of composite articles made up of separately molded elements, cementing and adaptation become easier. Effectively, two new-molded parts will only be reliably cemented together provided no vulcanization has developed within the same. This requirement can only be fulfilled easily where molding has been carried out at surrounding temperature;

(c) Molds made of plaster or like heavy and brittle material which therefore were not quite suitable for the manufacture of somewhat bulky articles can now be used more extensively.

The fact that in the performance of my method instability of the latex-zinc oxide mixture at surrounding temperature is aimed at makes it necessary to modify the procedure in dealing with the latex baths. Thus, the following course may advantageously be followed: the ammoniated latex treated with ferments or ferment-generating substances and admixed with the usual ingredients except the zinc oxide is charged into a first container and a 30 to 50 per cent zinc oxide colloidal dispersion is similarly charged into another container; each container is provided at the bottom thereof with an adjustable orifice so that controlled amounts of either fluid can be allowed to flow into an additional intermediate small-capacity container provided with an agitator to be run at very slow speed, said additional container acting as a feed funnel for the filling of the molds.

How long the latex-zinc oxide mixture will remain fluid depends on the treatments the latex has been subjected to and also on the surrounding temperature.

The following examples are given by way of explanation and should not be regarded as limitations in the performance of my method.

*Example 1.*—To fresh latex having a concentration of 55% and containing 0.5% of ammonia there are added 10 c.cm. of a suspension containing 10% of pancreatic extract. Ripening is allowed to proceed for 24 hours at 30° C.; the latex thus treated will gelify at a temperature of 30° C. 10 minutes after the addition thereto of the zinc oxide, this being an example of application in tropical countries.

*Example 2.*—To fresh latex of 55% concentration and containing 0.7% of ammonia there are added 20 c.cm. of a suspension containing 10% of pancreatic extract. Ripening is allowed to proceed for 4 days at 15° C. The latex thus treated will gelify at 15° C. 40 minutes after the zinc oxide has been added thereto, this being an example of application in temperate countries.

Although only zinc oxide has been referred to in the foregoing it should be understood that the invention extends to the use in similar conditions of other oxides, carbonates or sulphates of metals belonging to the zinc group.

What I claim as my invention and desire to secure by Letters Patent is:

1. A method of sensitizing and molding latex, applicable to the manufacture of articles by molding at normal temperature, comprising subjecting ammoniated latex to the action of pancreatic extract for degrading the proteins in said ammoniated latex, retaining the degradation products of the proteins in said latex, allowing said latex to ripen, then adding a small amount of zinc oxide in the form of an aqueous dispersion to the serum still containing the degradation products formed, pouring the mixture thus formed into a mold and allowing said mixture to gelify in the mold at surrounding temperature.

2. A method of sensitizing and molding latex comprising subjecting ammoniated latex to the action of pancreatic extract capable of degrading said latex, retaining the degradation products of the proteins in said latex, then admixing with said latex about 1% of zinc oxide in the form of a colloidal dispersion, pouring the mixture into a mold and allowing the mixture to gelify in the mold at surrounding temperature.

3. A method according to claim 1 wherein about 1% of zinc oxide is added as a sensitizer.

4. A method according to claim 1 wherein said degraded latex is admixed with vulcanization ingredients together with about 3% of zinc oxide, pouring the mixture thus obtained into a mold and allowing it to gelify therein at normal temperature.

5. A method according to claim 1 wherein first the vulcanization ingredients and then the zinc oxide are admixed with the latex.

6. A method according to claim 1 wherein the vulcanization ingredients and the zinc oxide are added simultaneously to the latex.

7. A method of sensitizing and molding latex applicable to the manufacture of articles by molding at normal temperature comprising subjecting ammoniated latex for 24 hours at a temperature of about 30° C. to the action of pancreatic extract, retaining the resulting degradation products of the proteins in said latex, then mixing therewith a small percentage of zinc oxide, then pouring said latex into a mold and allowing it to gelify therein at normal temperature.

PATRICE COMPAGNON.

REFERENCES CITED

The following references are of record in the file of this patent:

UNITED STATES PATENTS

| Number | Name | Date |
|---|---|---|
| 1,632,759 | Hopkinson | June 14, 1927 |
| 1,673,672 | Gibbons et al. | June 12, 1928 |
| 1,770,092 | Sutton | July 8, 1930 |
| 1,890,578 | Hayes et al. | Dec. 13, 1932 |
| 1,939,635 | Townsend | Dec. 12, 1933 |
| 1,998,897 | Kay | Apr. 23, 1935 |
| 2,097,481 | Wallerstein | Nov. 2, 1937 |